(No Model.)
F. H. PALMER.
INDICATOR FOR NON TRANSPARENT RECEPTACLES CONTAINING LIQUIDS.
No. 377,533. Patented Feb. 7, 1888.
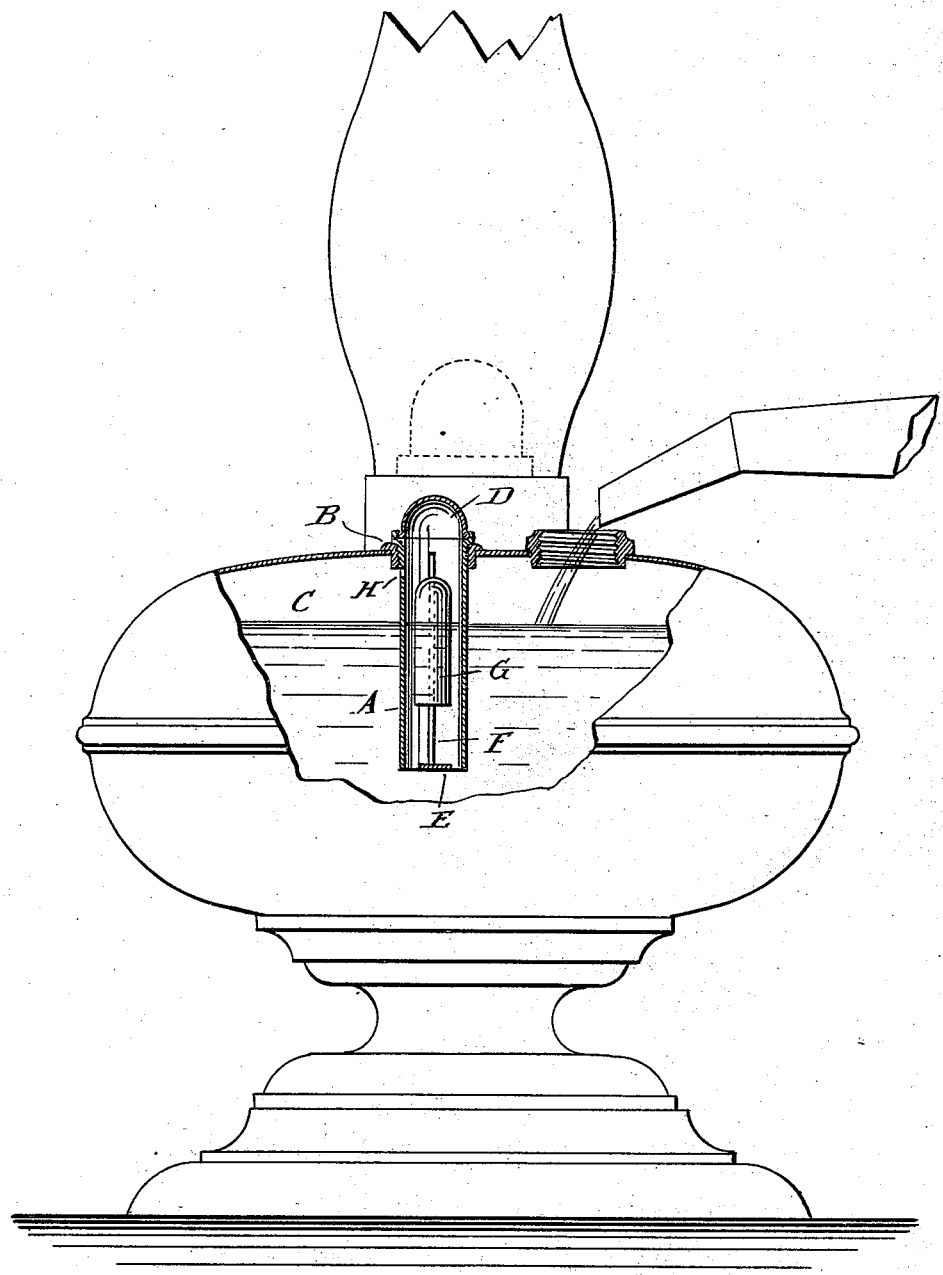
WITNESSES:
INVENTOR:
BY
ATTORNEYS.

UNITED STATES PATENT OFFICE.

FRANK. H. PALMER, OF LONG ISLAND CITY, NEW YORK.

INDICATOR FOR NON-TRANSPARENT RECEPTACLES CONTAINING LIQUIDS.

SPECIFICATION forming part of Letters Patent No. 377,533, dated February 7, 1888.

Application filed March 8, 1887. Serial No. 230,120. (No model.)

*To all whom it may concern:*

Be it known that I, FRANK. H. PALMER, of Long Island City, in the county of Queens and State of New York, have invented a new and Improved Indicator for Non-Transparent Receptacles Containing Liquid, of which the following is a full clear, and exact description.

The object of my invention is to provide a new and improved indicator specially adapted for non-transparent receptacles—such as lamps—for indicating the level of the oil when filling the lamp.

The invention consists of certain parts and details and combinations of the same, as will be fully described hereinafter, and then pointed out in the claims.

Reference is to be had to the accompanying drawing, forming a part of this specification, in which the figure represents a sectional elevation of my improvement attached to a lamp.

My improvement is specially adapted for non-transparent receptacles; and it consists of a tube, A, screwing into a nut, B, formed in the top of the receptacle C. The tube A extends downward a suitable distance into the receptacle C, and is closed at its outer top end with a cover, D, of glass or other transparent material.

The lower end of the tube is open, but a cross-piece, E, is secured to the same, and in the center of the cross piece is secured a rod, F, extending centrally upward in the tube A. On this rod F is held centrally the float G, adapted to slide freely on the rod F. The tube A is provided with perforations H below the inside surface of the top part of the receptacle C.

The operation is as follows: When the receptacle is empty, then the float rests on the cross-piece in the tube A; but when the receptacle is filled with liquid then the float rises with the liquid, extending about half its length above the level of the liquid, so that when the receptacle is sufficiently filled the upper end of the float G appears in the transparent cover D, and the operator who fills the receptacle can thus see that the same is nearly filled and contains all the liquid necessary. The air in the tube A can escape through the perforations H when the liquid rises, thus avoiding a back downward pressure on the float H.

It will be seen that by my improvement I am enabled to fill the receptacle safely with liquid without spilling the same by an overflow, and I also prevent partial filling of the receptacle, as the float G is only seen when the receptacle is nearly full, thus indicating the level of the liquid.

Having thus fully described my invention, what I claim as new, and desire to secure by Letters Patent, is—

1. In an indicator, the combination, with a reservoir and a downwardly-extending tube within said reservoir having perforations near its upper end, of a rod held centrally in said tube, a float adapted to slide freely on said rod, and a transparent cover secured to the top of said tube, substantially as shown and described.

2. In an indicator, the combination, with a reservoir and a downwardly-extending tube within said reservoir having perforations near its upper end, of a cross-piece secured to the lower open end of the tube, a rod extending centrally upward from said cross-piece, a float adapted to slide freely on said rod, and a transparent cover secured to the top of said tube, substantially as shown and described.

3. The combination, with a reservoir, of a tube secured to the top of said reservoir and extending inwardly in the same, a transparent cover secured to the top of said tube, extending beyond the top of the reservoir, and a float adapted to slide freely in said tube, substantially as shown and described.

FRANK. H. PALMER.

Witnesses:
THEO. G. HOSTER,
C. SEDGWICK.